United States Patent [19]
Lindbloom et al.

[11] Patent Number: 5,495,826
[45] Date of Patent: Mar. 5, 1996

[54] LIVESTOCK FEEDING PUMP OPERATED BY LICKING ACTION

[76] Inventors: Frank R. Lindbloom, 6501 Ellen La., Forestville, Calif. 95436; Leonard C. Lindbloom, 1804 Walnut Creek Ct., Santa Rosa, Calif. 95403

[21] Appl. No.: 320,928

[22] Filed: Oct. 11, 1994

[51] Int. Cl.$^6$ ................................................. A01K 7/06
[52] U.S. Cl. ................................................. 119/75
[58] Field of Search ........................... 119/51.03, 52.1, 119/53, 53.5, 54, 75, 72

[56] References Cited

U.S. PATENT DOCUMENTS

| | | | |
|---|---|---|---|
| 1,288,301 | 10/1918 | Rassmann | 119/75 |
| 1,744,007 | 1/1930 | Louden | 119/75 |
| 1,841,866 | 1/1932 | Wilson | 119/75 |
| 3,802,395 | 4/1974 | von Taschitzki | 119/75 |

*Primary Examiner*—Gene Mancene
*Assistant Examiner*—Thomas Price

[57] ABSTRACT

A livestock feeding pump includes a mounting plate mounted over a hole in a liquid feed tank, a cylindrical pump attached below the mounting plate and extended into the liquid feed, and a dish-shaped lever pivotally attached on top of the mounting plate for operating the pump. An animal licking the dish-shaped lever also depresses it to operate the pump: each lick causes the pump to dispense a predetermined amount of liquid feed onto the dish-shaped lever from the tank through a series of connecting conduit and valve. The dispensed amount can be precisely controlled by adjusting the travel of the dish-shaped lever and actuator. The livestock feeding pump can be mounted onto any feed tank, and it can be easily sized for fitting tanks of different depths. The mounting plate also seals the tank from contaminants.

14 Claims, 5 Drawing Sheets

5,495,826

LIVESTOCK FEEDING PUMP OPERATED BY LICKING ACTION

BACKGROUND OF THE INVENTION

1. Field of the Invention

This invention relates generally to livestock feeding devices, specifically to a feeding pump operated mechanically by the licking action of an animal.

2. Prior Art

Livestock are normally fed a ration that includes mainly dry feed, such as grass, hay, grain, etc., and a supplemental liquid feed composed of molasses, minerals, vitamins, and other nutrients. Wheel feeders have long been used for dispensing liquid feed. As shown in FIG. 1, a typical wheel feeder includes a wheel 100 mounted vertically within a tank 101 containing a liquid feed 102. The top portion of wheel 100 extends above the top of tank 101 through a slot 103, while the bottom portion of wheel 100 is submerged within liquid feed 102. An animal (not shown) licking wheel 100 causes it to rotate, as shown by the arrow, which picks up liquid feed 102 as a film 104 along its edge. As the animal licks off film 104, wheel 100 is caused to rotate further and pick up more liquid feed 102. There are different wheel feeders available having differently shaped wheels and tanks, but they all use the same basic principle.

Although wheel feeders are simple to build and operate, they have some drawbacks:

A. They can over feed the animals because liquid feed is highly viscous, so that the wheels picks up a very thick coating that cannot be controlled in volume. An animal consumes a substantial amount of liquid with each lick. As a result, over feeding can occur in a short time.

B. They are susceptible to contamination from debris and dirt falling onto the wheels and carried into the liquid feed. Dirt and debris can also fall through the slots.

OBJECTS AND ADVANTAGES

Accordingly the primary objects and advantages of the present invention are to provide an improved livestock feeding device or pump, a livestock feeding pump which dispenses an adjustable amount of liquid feed, and which protects the feed tank from contamination.

Other objects and advantages of the invention are to provide a livestock feeding pump which is mechanically operated by an animal's normal feeding actions, which withstands corrosive liquid feed, and which can be mounted onto any feed tank.

SUMMARY OF THE INVENTION

The livestock feeding pump includes a dish-shaped lever pivotally attached to the top side of a mounting plate fitted over a hole in a liquid feed tank. A cylindrical pump extends into the liquid feed in the tank from the bottom side of the mounting plate. A spring-loaded plunger or actuator extending upwardly from the pump cylinder engages the bottom side of the dish-shaped lever, which when depressed by the tongue of an animal licking it, pushes down the actuator to pump a predetermined amount of liquid feed onto the dish through a connecting conduit. The amount of liquid dispensed is adjustable by a screw in the dish-shaped lever that adjusts the travel of the lever and the actuator's shaft.

Figure 1:
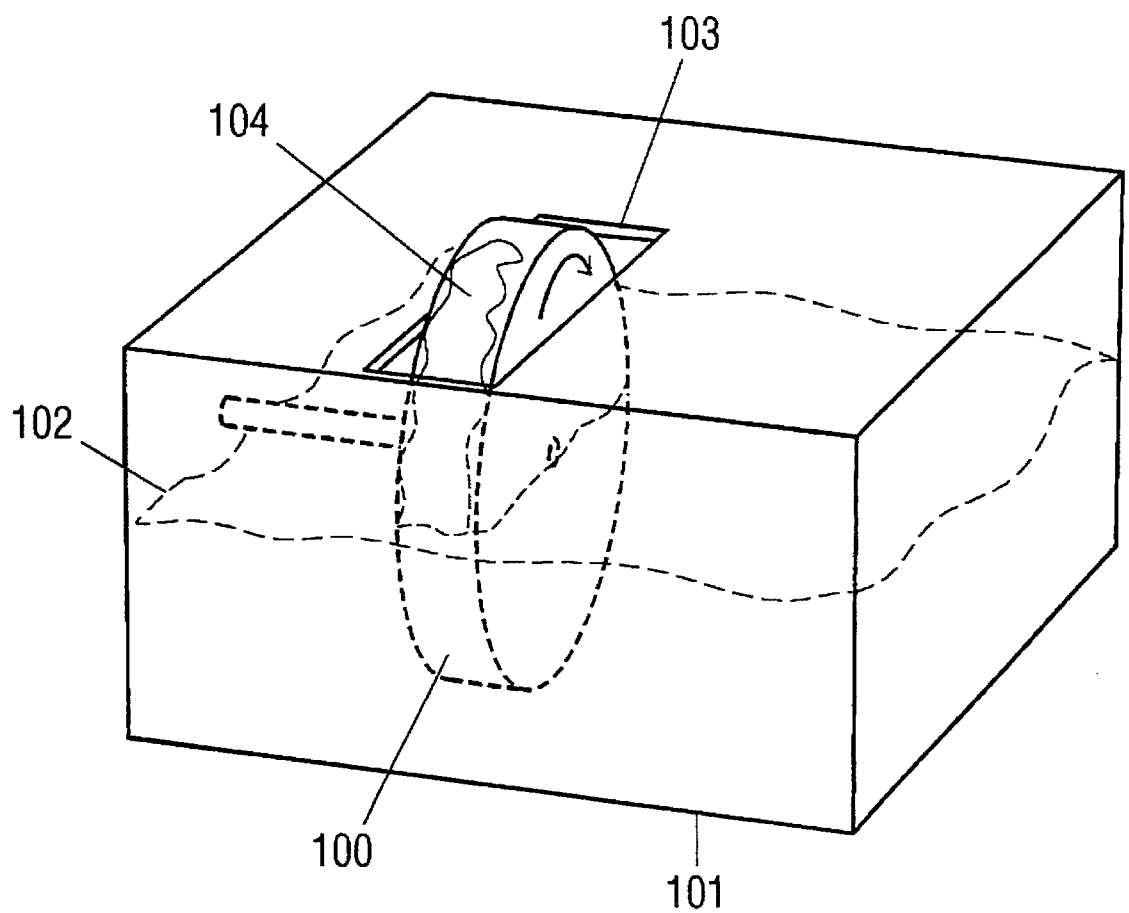
FIG. 1 is a front isometric view of a prior art livestock feeder.

| Drawing Reference Numerals | |
|---|---|
| 10. Dish-Shaped Lever | 11. Mounting Plate |
| 12. Pump | 13. One-Way Valve |
| 14. Troughs | 15. Protective Cover |
| 16. Hinge | 17. Arms |
| 18. Adjustment Bolt | 19. Blisters |
| 20. Chain Guard | 21. Notch |
| 22. Mounting Holes | 23. Retaining Cap |
| 24. Upper Cylinder Of Pump | 25. Lower Cylinder of Pump |
| 26. Connecting Sleeve | 27. Intake Apertures |
| 28. End Cap | 29. Outlet |
| 30. Conduit | 31. Male Fitting |
| 32. Conduit | 33. Hole |
| 34. Actuator | 35. Plate |
| 36. Spring | 37. Washer |
| 38. Retaining Nut | 39. Flange |
| 40. Rubber Piston | 41. Feed Tank |
| 42. Screws | 43. Liquid Feed |
| 100. Wheel | 101. Feed Tank |
| 102. Liquid Feed | 103. Slot |
| 104. Film Of Liquid Feed | |

DESCRIPTION - FIG. 2

Figure 2:
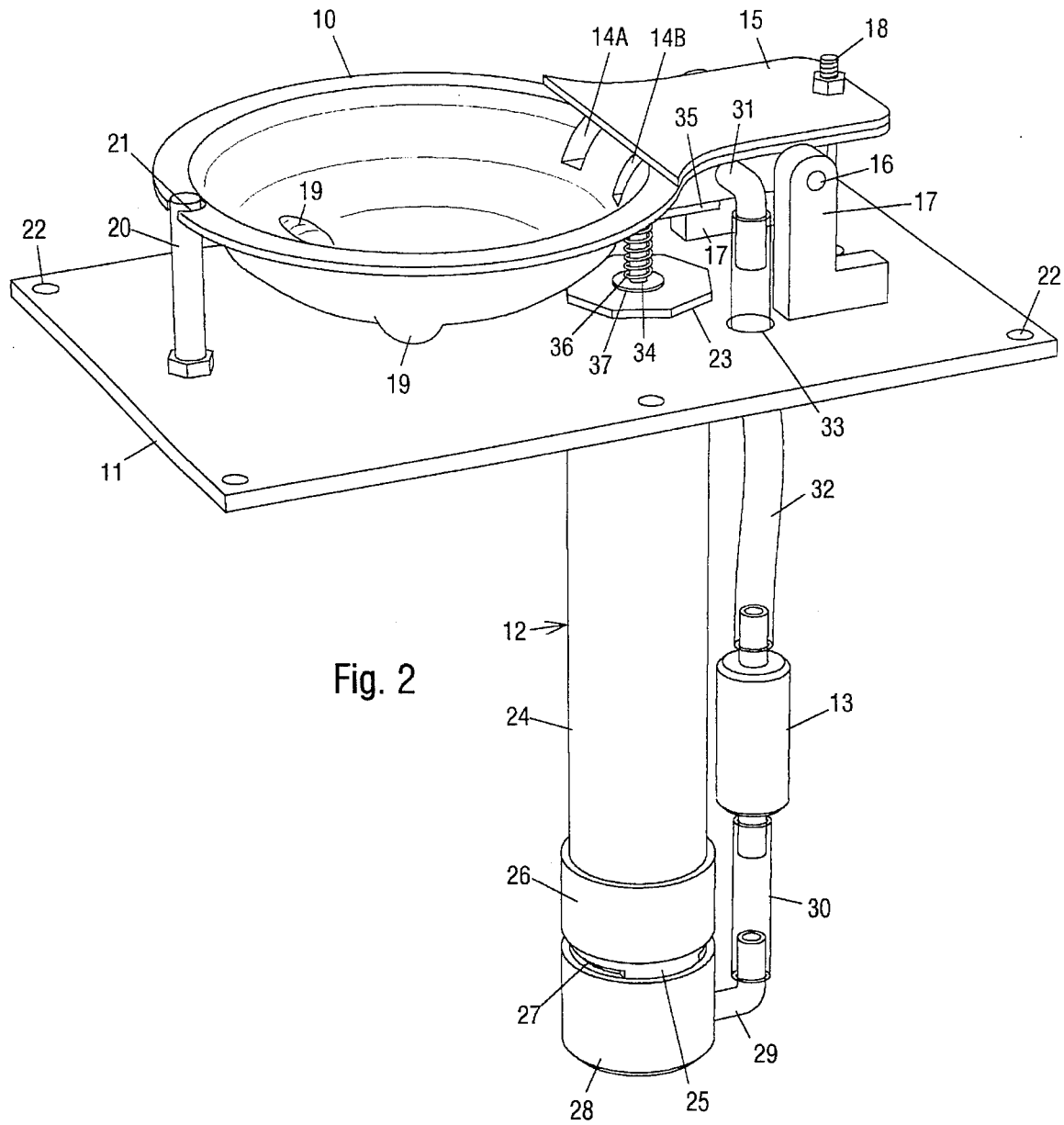
FIG. 2 is a side isometric view of a livestock feeding pump in accordance with a preferred embodiment of the invention.

In accordance with a preferred embodiment of the invention shown in the side isometric view in FIG. 2, a livestock feeding pump includes a bowl or dish-shaped lever 10, a mounting plate 11, a cylindrical pump 12, and a conventional one-way valve 13.

Dish-shaped lever 10 includes a pair of troughs 14A and 14B extending away therefrom. The top of troughs 14A and 14B are shielded with a protective cover 15. A hinge 16 extending through the distal ends of troughs 14A and 14B pivotally mounts dish-shaped lever 10 on a pair of arms 17 attached on top of mounting plate 11. An adjustment bolt 18 is mounted through cover 15 from thereunder, between and separate from arms 17. A pair of spaced apart blisters 19 extend under dish-shaped lever 10. A neck-chain guard 20 is attached to mounting plate 11, and extends through a notch 21 in the rim of dish-shaped lever 10. Mounting plate 11 includes several mounting holes 22 distributed around its edge.

Cylindrical pump 12 is mounted under mounting plate 11 by a retaining cap 23 extending through it. Pump 12 includes an upper cylinder 24 connected to a lower cylinder 25 by a connecting sleeve 26. Lower cylinder 25 includes a pair of slits or intake apertures 27, and is closed by an end cap 28. An outlet 29 extends from end cap 28, and is connected to the lower end of one-way valve 13 with a clear vinyl conduit 30. One-way valve 13 is oriented for allowing the passage of a fluid (not shown) in the upward direction. A male conduit fitting 31 extends from and communicates with trough 14B. Fitting 31 is connected to the upper end of one-way valve 13 by a clear vinyl conduit 32 extending through a hole 33 in mounting plate 11. A sliding plunger or actuator 34 extending through retaining cap 23 is positioned under a plate 35 attached to the bottom of troughs 14A and 14B. A spring 36 disposed around actuator 34 rests on a washer 37.

DESCRIPTION—FIG. 3

Figure 3:
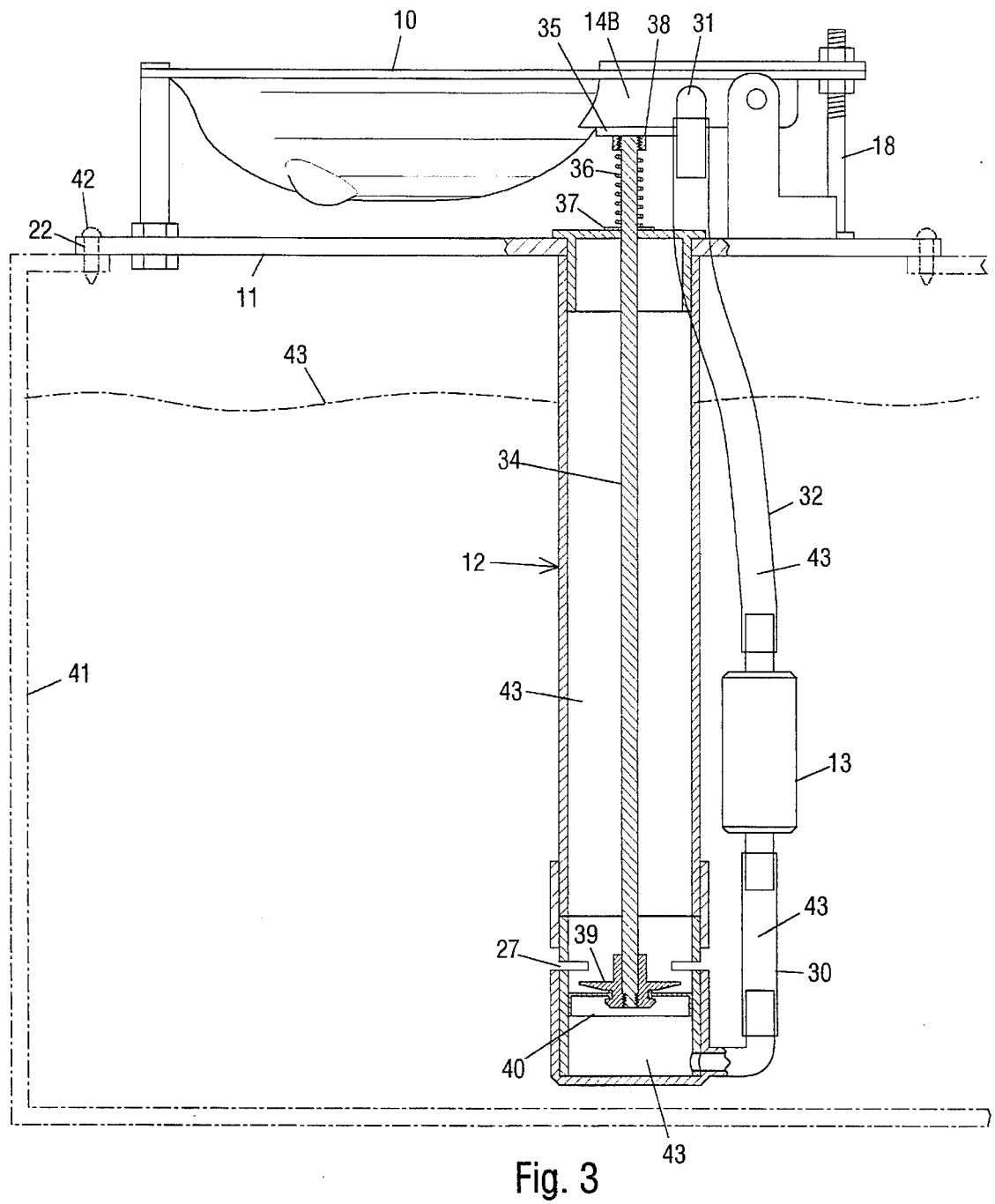
FIG. 3 is a partial sectional side view of the livestock feeding pump of FIG. 2.

As shown in the partial sectional side view in FIG. 3, spring 36 is compressed between washer 37 and a retaining nut 38 attached to the top end of actuator 34. Spring 36 urges nut 38 and actuator 34 upwardly, which pushes against plate 35 to urge dish-shaped lever 10 to rotate clockwise, so that the free lower end of adjustment bolt 18 butts against the top surface of mounting plate 11. The position of dish-shaped lever 10 is determined by the vertical position of adjustment bolt 18: turning bolt 18 to a higher position raises dish-shaped lever 10, and vice versa. The lower end of actuator 34 includes a rigid flange 39 with a rubber piston 40 secured thereto. The lower surface of flange 39 has a shallow taper or semi-spherical shape.

The livestock feeding pump is attached to an opening on a typical feed tank 41 with screws 42 inserted through holes 22 in mounting plate 11. Pump 12 is submerged within liquid feed 43 held in tank 41. The entire interior volume of pump 12 is filled with liquid feed 43, both above and below piston 40. The livestock feeding pump can be installed on any feed tank having a suitably sized opening, and cylindrical pump 12, actuator 34, and conduit 32 can be made in different lengths for reaching the bottom of any feed tank. When installed onto tank 41, mounting plate 11 substantially seals tank 41 to prevent contamination of liquid feed 43.

OPERATION—FIG. 4—DOWNSTROKE

Figure 4:
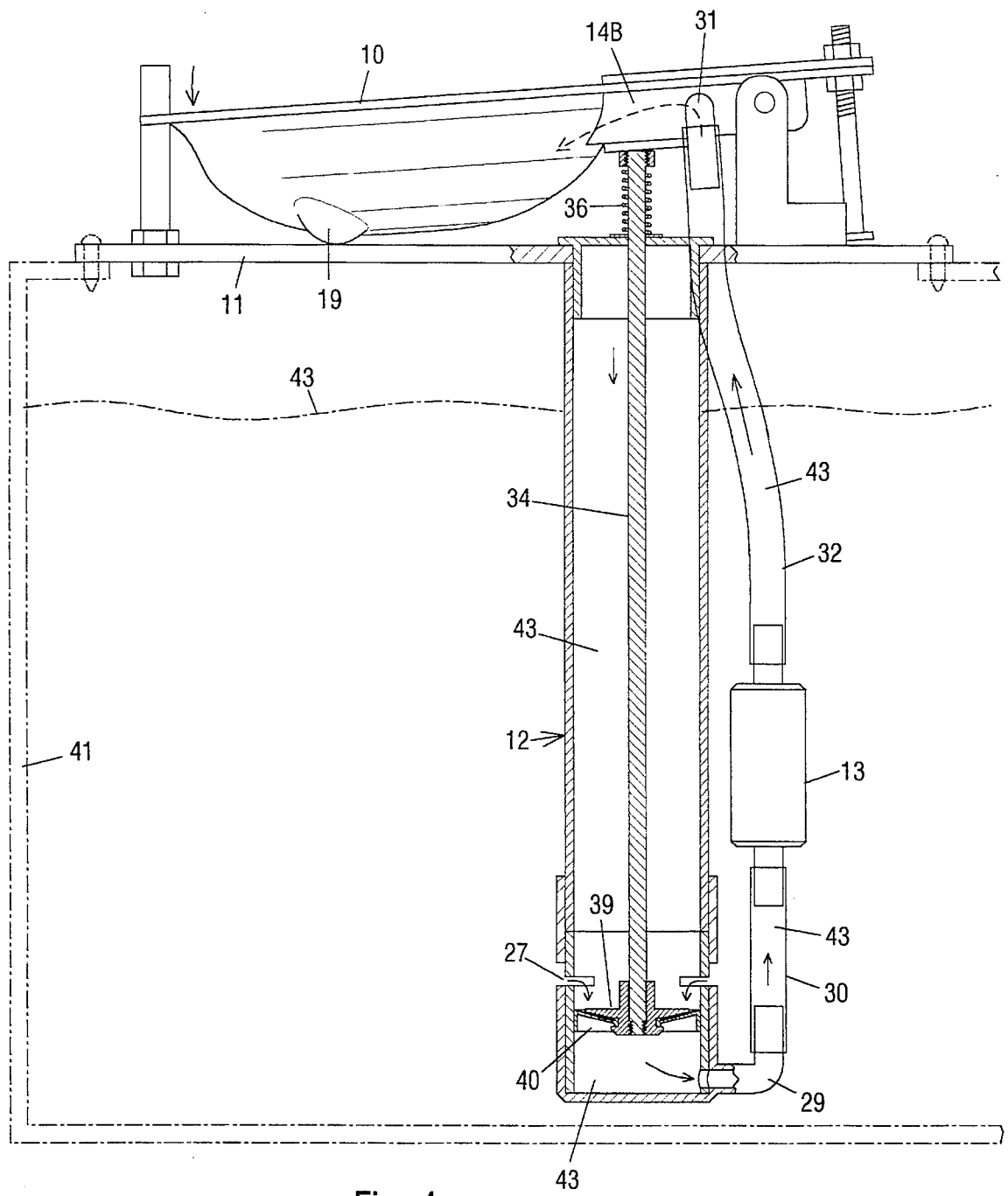
FIG. 4 is a partial sectional side view of the livestock feeding pump on a downstroke.

When the livestock feeding pump is first installed onto tank 41, pump 12, conduit 30 and 32, and valve 13 are filled only with air. The livestock feeding pump is charged by repeatedly depressing and releasing dish-shaped lever 10 until all the air is pumped out and replaced with liquid feed 43. Each additional cycle of depressing and releasing dish-shaped lever 10 causes liquid feed 43 to be pumped onto dish-shaped lever 10. Assuming that the livestock feeding pump is already charged with liquid feed, the pumping operation works as follows:

When an animal (not shown) licks dish-shaped lever 10, its tongue pushes dish-shaped lever 10 and actuator 34 downwardly against spring 36, as indicated by the arrows, until blisters 19 (one shown) make contact with mounting plate 11, as shown in FIG. 4. The strength of spring 36 can be selected to suit different types of animals: a stronger spring for larger animals, such as cattle; and a weaker spring for smaller animals, such as goats. Blisters 19, which are spaced apart laterally, minimize structural stress on troughs 14A (FIG. 1) and 14B by preventing dish-shaped lever 10 from being rocked side-to-side. When actuator 34 is pushed downwardly, rubber piston 40 is also pushed downwardly to force a small amount of liquid feed 43 outwardly through outlet 29, and advance the column of liquid feed 43 upwardly through conduit 30, one-way valve 13, conduit 32, fitting 31, trough 14B, and into dish-shaped lever 10, as indicated by the arrows. Trough 14A (FIG. 1) is not used for carrying liquid feed 43.

During the downstroke, rubber piston 40 is deformed against the tapered lower side of flange 39 to press the rim of piston 40 against the interior wall of pump 12 to form a seal. As liquid feed 43 below piston 40 is pumped out, liquid feed 43 in tank 41 is also drawn into pump 12 through intake apertures 27 during the downstroke to replenish pump 12, as indicated by the arrows.

OPERATION—FIG. 5—UPSTROKE

Figure 5:
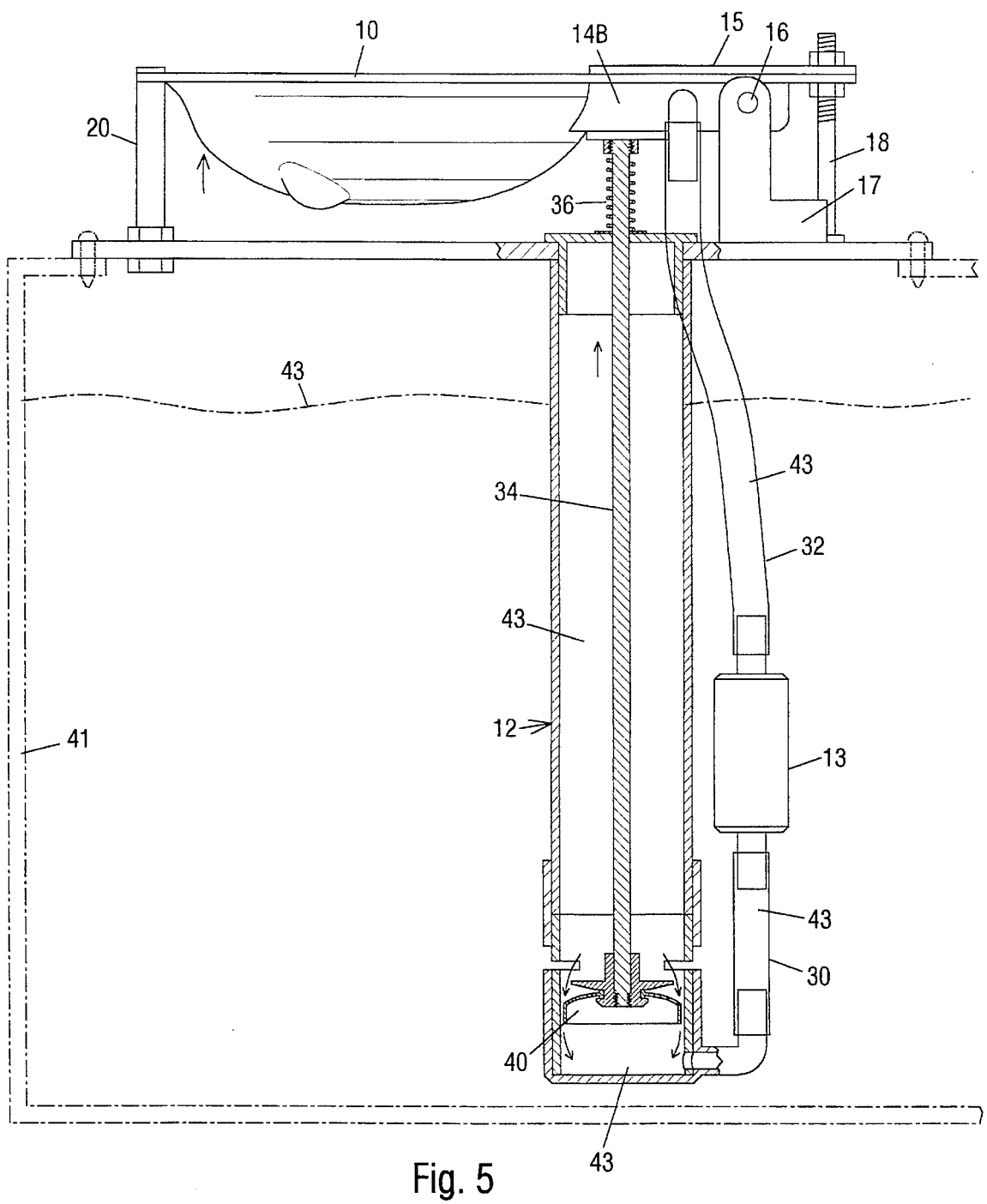
FIG. 5 is a partial sectional side view of the livestock feeding pump on an upstroke.

When the animal (not shown) lifts its tongue from dish-shaped lever 10 at the end of each lick, dish-shaped lever 10 is released, so that spring 36 pushes actuator 34 and dish-shaped lever 10 back up to their normal positions, as indicated by the arrows in FIG. 5. During the upstroke of actuator 34, piston 40 is pulled upwardly. Because one-way valve 13 prevents liquid feed 43 from being drawn back into pump 12 from conduits 30 and 32, negative pressure is developed under piston 40, which becomes deformed as shown. As a result, liquid feed 43 above piston 40 is sucked into the space thereunder by forcing past the rim of piston 40, as indicated by the arrows. After actuator 34 has reached its topmost position, resilient piston 40 will return to its neutral shape, as shown in FIG. 3.

As the animal repeatedly licks dish-shaped lever 10, it is caused to be alternately depressed and released to pump liquid feed 43 onto it in a series of small spurts, i.e., dish-shaped lever 10 acts as the lever of pump 12. The amount of liquid feed 43 pumped during each pumping cycle is determined by the travel of actuator 34: more feed can be pumped by turning adjustment screw 18 to raise dish-shaped lever 10 for more travel, and vice versa. The pumping volume can be adjusted to suit different types of livestock, and it can be adjusted to be small enough to prevent over feeding, i.e., an animal will get tired of licking before becoming over fed. Chain guard 20 prevents neck chains—commonly found on livestock—from going under dish-shaped lever 10 and possibly strangling the animal. Cover plate 15 prevents contaminants from entering trough 14B and conduit 32.

In the preferred embodiment, all parts of the livestock feeding pump are made of materials selected for strength and corrosion resistance: pivot 16, adjustment bolt 18, actuator 34, and spring 36 are made of stainless steel; arms 17 are made of brass; chain guard 20 is made of galvanized steel; and everything else are made of plastic.

CONCLUSION, RAMIFICATIONS, AND SCOPE

Accordingly the reader will see that we have provided an improved livestock feeding device. Its dispenses an adjustable amount of liquid feed each time an animal licks on it; the dispensed amount can be adjusted to be small enough to prevent over feeding. It can be easily fitted to any feed tank with a suitably sized hole, and it can also be easily sized for tanks of different depths. When installed, it seals the feed tank from contaminants. It is also corrosion resistant.

Although the above descriptions are specific, they should not be considered as limitations on the scope of the invention, but only as examples of the preferred embodiment. Many other ramifications and variations are possible within the teachings of the invention. For example, the various components of the livestock feeding pump can be made of other suitable materials. The shape of the dish-shaped lever can be changed. The adjustment bolt can be eliminated by using a threaded bolt for the chain guard, and adding a nut to its top end for serving as an adjustable stop for the dish-shaped lever. The pump cylinder and actuator can be made in different lengths for fitting different feed tanks. A variety of suitable one-way valves can be used. Other types of lever-activated pumps can be used. Instead of mounting on top of a tank, the pump can be inverted for mounting on the bottom of an overhanging tank, or it can be separately mounted elsewhere and connected to the tank with long tubing. Instead of a mechanical actuator, the dish-shaped lever can be used for operating a switch for activating an electrical pump, so that the switch becomes the actuator. Instead of being hinged, the dish can be mounted directly onto the pump actuator if a spring of light enough force is used, or if the actuator is an electrical switch. Instead of liquid animal feed, the feeder can be used for dispensing other types of materials. Therefore, the scope of the invention should not be determined by the examples given, but by the appended claims and their legal equivalents.

We claim:

1. An animal feeding device for dispensing food from a container, comprising:

a dish-shaped lever having a hinge for pivoting movement, and a pump having an intake adapted to communicate with said container, said pump having an outlet communicating with said dish-shaped lever, said pump having an actuator connected to said dish-shaped lever and operated by the pivoting movement thereof, so that an animal licking and thus pivoting said dish-shaped lever also operates said actuator to pump said food from said container onto said dish-shaped lever.

2. The animal feeding device of claim 1 wherein said pump is positioned under said dish-shaped lever.

3. The animal feeding device of claim 1 wherein said pump comprises a cylindrical pump having a sliding piston.

4. The animal feeding device of claim 1, further including a chain guard positioned at one end of said dish-shaped lever and adapted to prevent a neck chain on said animal from being tangled thereon.

5. The animal feeding device of claim 1, further including adjusting means secured to said lever for adjusting said dish-shaped lever in travel.

6. The animal feeding device of claim 5 wherein said adjusting means comprises an adjustment bolt threaded onto said dish-shaped lever for adjusting said travel.

7. An animal feeding device for dispensing food from a container, comprising:

a mounting plate adapted to be mounted across an opening on said container, a dish-shaped lever pivotally mounted on said mounting plate, a pump mounted on said mounting plate, said pump having an intake adapted to communicate with said container, said pump having an outlet communicating with said dish-shaped lever, said pump including an actuator engaging and operated by said dish-shaped lever, and a spring for biasing said actuator against said dish-shaped lever, whereby an animal licking and thus pivoting said dish-shaped lever also operates said actuator to pump said food from said container onto said dish-shaped lever.

8. The animal feeding device of claim 7, further including a one-way valve connected between said outlet of said pump and said dish-shaped lever.

9. The animal feeding device of claim 7, further including adjusting means secured to said lever for adjusting said dish-shaped lever in travel.

10. The animal feeding device of claim 9 wherein said adjusting means comprises an adjustment bolt threaded onto said dish-shaped lever for adjusting said travel.

11. An animal feeding device for dispensing food from a container, comprising:

a horizontal mounting plate adapted to be mounted across an opening on top of said container, a dish-shaped lever pivotally mounted on top of said mounting plate, a pump mounted under said mounting plate, said pump having an intake adapted to be positioned within said container, said pump including an actuator extending up through said mounting plate and engaging a lower side of said dish-shaped lever, a spring for biasing said actuator upwardly against said dish-shaped lever, and a conduit connecting an outlet of said pump to said dish-shaped lever, whereby an animal licking said dish-shaped lever also pivots it downwardly to operate said actuator to pump said food from said container onto said dish-shaped lever through said conduit.

12. The animal feeding device of claim 11, further including a one-way valve connected in-line along said conduit.

13. The animal feeding device of claim 11, further including adjusting means secured to said lever for adjusting said dish-shaped lever in travel.

14. The animal feeding device of claim 13 wherein said adjusting means comprises an adjustment bolt threaded onto said dish-shaped lever for adjusting said travel.

* * * * *